May 7, 1929. J. A. ESPINOLA 1,712,139
DENTAL FILLING APPARATUS
Filed Aug. 23, 1927

INVENTOR
Jovino A. Espinola
BY
ATTORNEY

Patented May 7, 1929.

1,712,139

UNITED STATES PATENT OFFICE.

JOVINO A. ESPINOLA, OF LA VEGA, DOMINICAN REPUBLIC, WEST INDIES.

DENTAL FILLING APPARATUS.

Application filed August 23, 1927. Serial No. 214,850.

This invention relates generally to dental apparatus, and in particular to a universal filling press, adapted for filling cavities in teeth.

The object of the invention is to provide a universal filling press of novel construction and arrangement of parts embodying certain adjustable features hereinafter more fully described, claimed and illustrated in the accompanying drawing.

Figure 1:
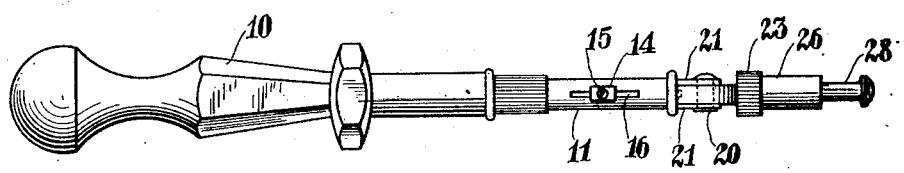
Fig. 1 is a top plan view of my improved device.
Figure 2:
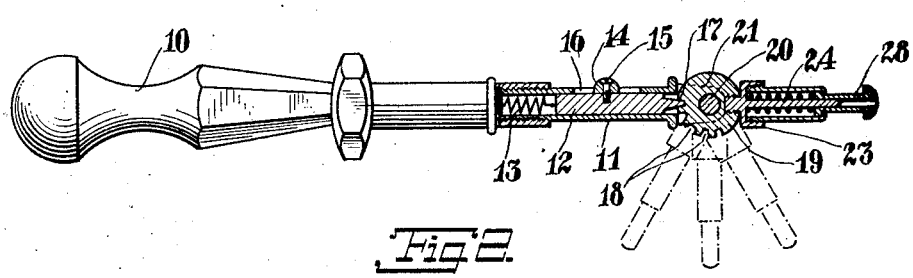
Fig. 2 is a side elevational view thereof, partly in section, so as to more clearly show the construction thereof.
Figure 3:
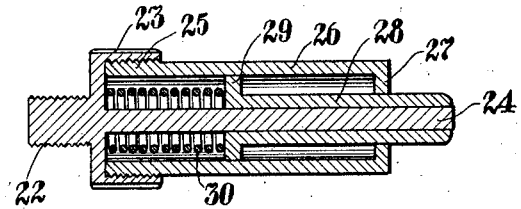
Fig. 3 is an enlarged sectional view of the automatic point and holding mechanism embodied therein.

As here embodied my improved universal filling press comprises a handle member 10 of any suitable design and shape, preferably ornamental and pleasing to the eye, and adapted to be easily held in the hand of the person desiring to use my improved device.

One extremity of the handle member 10, is provided with a threaded opening, adapted to receive the holder 11. The holder 11 is provided with an axial bore, adapted to slidably receive the plunger 12, which is maintained therein by an extended member 14, secured to the plunger 12, as, at 15, by a screw, bolt, or the like. The extended member 14 is positioned in the elongated slot 16, formed in the holder 11. The expansion spring 13 is positioned in the said axial bore of the holder 11, beneath the plunger 12, so as to normally hold the extremity 17 of the plunger in registration with any desired one of the apertures 18, found in the cylindrical member 19, or disc, rotatively mounted, as at 20, in the lug elements 21 of the holder 11, for the purpose as hereinafter set forth.

The disc 19 is provided with a threaded aperture, adapted to receive the threaded portion 22 of the automatic point, which is provided with an enlarged portion 23, or collar, extended therefrom, and an extended central portion 24 or stem, extending considerably beyond the collar 23. The collar 23 is provided with an internal thread, adapted to receive the threaded portion 25 of the retainer 26 of tubular construction, extended therefrom, and provided with an inwardly protruding element 27 or extremity. The filling holder 28 is slidably mounted on the central protion 24 of the said automatic point, and is provided with an extended portion 29, or enlarged extremity. The expansion spring 30 is positioned or wound on the central portion 24 of the said automatic point, beneath the filling holder 28, so as to normally hold the said filling holder in an extended position.

The above described construction is such as will permit the automatic point to be held in a horizontally extended position, downwardly extended position, or at a relatively angularly extended position, from the said horizontally and downwardly extended positions, by means of disengaging the said plunger, so as to permit the said disc member 19 to be partly rotated.

The operation or manipulation of my improved device is as follows, the opening of the filling member 28 is filled, with a paste filling such as ordinarily used in dentistry to fill teeth and is held directly over the cavity of the tooth to be filled by means of pressing on the handle member 10, the said filling is injected into the said cavity.

Figure 4:
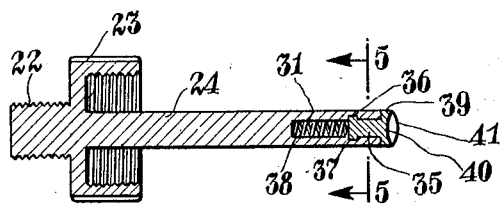
Fig. 4 is a detail sectional view illustrating a further development of the automatic point, as embodied in my improved device.
Figure 5:
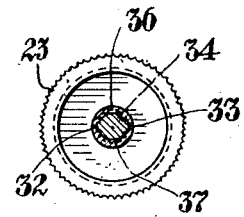
Fig. 5 is a transverse sectional view taken on the line 5—5 of Fig. 4.
Figure 6:
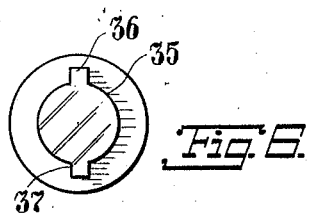
Fig. 6 is an end elevational view of the automatic point proper as embodied therein.

In Figs. 4, 5 and 6 of the accompanying drawing, I have shown the central portion 24' similar to above mentioned automatic point and provided with an axial opening 31 having oppositely positioned extended apertures 32 and 33 extending from the extremity of the said opening in proximity to the center thereof, intercommunicative with, or connecting with the enlarged portion 34 of the opening 31. The automatic point 35 is provided with oppositely extended portions 36 and 37, as a means of holding the said point proper 35 in position in the central portion 24' and an expansion spring 38, normally urges the point proper outwardly so as to securely hold the said point proper in position therein. The point proper 35 is provided with an enlarged head 39 having a convexly shaped extermity 40 or conically shaped head 41. The above described construction is such as will permit the said points proper 35 to be readily interchangeable.

Having thus described my invention, what

I claim as new and desire to protect by Letters Patent of the United States is as follows:

1. A dental filling device, comprising a stem member provided at the rear end with an enlarged portion formed with internal threads, a handle arranged for connection with the rear end of the said enlarged portion, a retainer of tubular construction threadedly engaged with the said internal threads and provided with an inwardly protruding element, a filling holder having a central aperture forming a chamber and being slidably mounted on the stem and provided with an enlarged extremity abuttable with the rear side of the said inwardly protruding element, and an expansion spring co-axially arranged on the stem normally urging the filling holder forward into extended position, for exposing a portion of the chamber for holding dental filling paste.

2. A dental filling device, comprising a stem member provided at the rear end with an enlarged portion formed with internal threads, a handle arranged for connection with the rear end of the said enlarged portion, a retainer of tubular construction threadedly engaged with the said internal threads and provided with an inwardly protruding element, a filling holder having a central aperture forming a chamber and being slidably mounted on the stem and provided with an enlarged extremity abuttable with the rear side of the said inwardly protruding element, and a means for normally urging the filling holder forward into extended position, for exposing a portion of the chamber for holding dental filling paste.

3. A dental filling device, comprising a stem member provided at the rear end with an enlarged portion formed with internal threads, a handle arranged for connection with the rear end of the said enlarged portion, a retainer of tubular construction threadedly engaged with the said internal threads and provided with an inwardly protruding element, a filling holder having a central aperture forming a chamber and being arranged for sliding on the stem into extended and retracted positions, the said filling holder being formed with an enlarged rear extremity abuttable against the said inwardly protruding element for determining its extended position, and a means for normally urging the filling holder forward into extended position exposing a portion of the said chamber for holding dental filling paste.

In testimony whereof I have affixed my signature.

JOVINO A. ESPINOLA.